Patented July 29, 1947

2,424,951

UNITED STATES PATENT OFFICE 2,424,951

PROCESS OF MAKING MIXTURES OF EMULSIFYING AND WETTING AGENTS

Alfred R. Globus, Forest Hills, N. Y.

No Drawing. Application September 19, 1946,
Serial No. 697,906

6 Claims. (Cl. 252—353)

This invention relates to new processes for producing mixtures of chemical compounds having properties which adapt them for use both as emulsifying agents and as wetting agents.

Emulsifying agents of a wide variety of compositions either have appeared upon the market or have been described in the literature and the same is true also of wetting agents, that is, of those compounds or mixtures which serve to decrease the surface tensions of solutions of which they are components. Compounds or mixtures which may serve both as emulsifying agents and as wetting agents are not so commonly known.

Among the compounds utilized commercially because of their emulsifying properties are the derivatives of the sulfonated aromatic hydrocarbons, such, for example, as sodium benzene sulfonate. In the production of compounds of this nature it is customary to treat the aromatic hydrocarbon, such as benzene, with an excess of sulphuric acid in order to obtain a complete conversion of the hydrocarbon to the corresponding sulphonic acid. Tests of technical grades of various aromatic sulphonic acids have shown the presence of from one to twenty-three percent of free $SO_3$. In making the emulsifying agent from such a sulphonic acid, therefore, this free $SO_3$ is commonly removed by the process of "liming," that is, by the addition of lime, resulting in the formation of calcium sulphate and calcium sulphonate. Since the calcium sulphonate is soluble, the insoluble calcium sulphate may be removed from the product of this reaction by filtration. Free sulphonic acid may then be obtained by adding to the calcium sulphonate the required amount of sulphuric acid to take up the calcium therefrom, this reaction resulting in the formation of free sulphonic acid and calcium sulphate, the latter being then precipitated and filtered off. When it is desired to form, instead, an alkali metal derivative directly from the calcium sulphonate, the sulphate of the alkali metal may be caused to react with the calcium sulphonate, such reaction resulting in the formation of the alkali salt of the sulphonic acid and the insoluble calcium sulphate, which, as before, may be filtered off.

In producing the combined emulsifying and wetting agent of the present invention the excess of sulphuric acid used in obtaining a substantially complete conversion of the selected hydrocarbon to the corresponding sulphonic acid is so removed that not only are no subsequent refining steps required to produce the desired product but that said acid, as an incident to its removal, reacts with the removing agent to form, with the sulphonic acid, a mixture of acids which, when neutralized, constitute the combined emulsifying and wetting agent that is a principal object of the present invention. In this connection it may be stated that not only does the invention aim to provide an improved chemical product having superior emulsifying and wetting properties, but the invention aims to provide an improved process for producing such wetting and emulsifying agents which will permit the use of a great variety of materials to produce the desired end product.

In practicing my novel process for producing an improved combined emulsifying and wetting agent I reflux the selected hydrocarbon, which may be either an aromatic or an aliphatic hydrocarbon, although the aromatic hydrocarbons are preferred, with an excess of concentrated sulphuric acid until the sulphonation has been completed, the monosulphonate being formed. This product is now stirred into refrigerated water until a concentrated solution of the hydrocarbon sulphonic acid has been obtained, this solution, of course, containing some free sulphuric acid. The concentrated solution thus prepared is now heated to a temperature of 60° C. or higher and a suitable compatible unsaturated compound, such as more fully described below, is stirred into the hot solution. The reaction which takes place results in the absorption of the free sulphuric acid and its combination with the unsaturated compound that has been added to the solution to form the sulphonic derivative thereof.

Sufficient of the unsaturated compound is usually added to the solution so that the end product of the reaction will contain a small amount of free unsaturated compound. This mixture of the hydrocarbon sulphonic acid, the sulphonated derivative of the unsaturated compound and the small excess of the uncombined unsaturated compound may now be treated by a suitable neutralizing agent to effect the neutralization of the mixture. Suitable neutralizing agents are the ethanolamines. This neutralization of the mixture results in the formation of the combined emulsifying and wetting agent which is one of the objects of the present invention.

A specific example of the application of the novel process of the present invention to produce the novel end product of the present invention is the following:

A technical grade of cyclohexane is sulphonated with an excess of concentrated sulphuric acid, the acid being of a concentration of from ninety-three to ninety-five per cent $H_2SO_4$ by weight. In carrying out the sulphonation step the excess of sulphuric acid employed should be at least fifty percent over the amount called for by the following reaction:

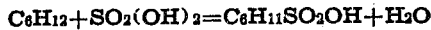
$$C_6H_{12}+SO_2(OH)_2=C_6H_{11}SO_2OH+H_2O$$

The cyclohexane monosulphonic acid, resulting from the sulphonation of the cyclohexane by concentrated sulphuric acid, is now stirred into water maintained at almost 0° C. to produce a fifty percent solution of the said acid. The temperature may be allowed to rise toward the end of the addition of the cyclohexane monosulphonic acid to the water and then it is preferably brought up to from 65° to 90° C. The higher the temperature during the next step in the process, the better, provided that it does not become high enough to cause excessive foaming. The temperature at which foaming occurs varies with the absorbing agent to be used.

To the hot concentrated solution of cyclohexane monosulphonic acid, which solution obviously contains also the excess sulphuric acid which was not used up in the formation of the sulphonic acid, is now added the absorbing agent for taking up this excess $H_2SO_4$, this agent being added slowly with stirring. The absorbing agent may be defined as any unsaturated organic acid, belonging to the aliphatic series of hydrocarbons, that has at least one double bond and that comprises at least ten carbon atoms per molecule. While unsaturated organic acids of the aliphatic series of hydrocarbons having less than ten carbon atoms per molecule are capable of acting as absorbents, the products resulting from their use are not desirable from the standpoint of this invention.

Compounds coming within the definition of absorbing agents above given act chiefly through addition at their double bonds of the excess sulphuric acid, this addition reaction forming what may be considered as a sulphated acid. Examples of unsaturated acids, coming within the above definition of absorbing agents, that may be utilized to practice the process of the present invention and to produce the desired end product, are linoleic, erucic and oleic acids. Other unsaturated acids which may also be used are ricinoleic, clupanodonic, linolenic and palmitoleic acids. In place of the actual acids their respective anhydrides may likewise be used.

An important advantage of the present invention lies in the number of compounds which are suitable for use as absorbing agents, as set forth in the foregoing paragraph, whereby any possible difficulty of securing the raw materials to practice the process is avoided. Linoleic acid is a common constituent of maize and cottonseed, erucic acid of rapeseed and fish oils, oleic acid of ordinary fats and oils, ricinoleic acid of castor oils, clupanodonic acid of fish liver and blubber oils and linolenic acid of linseed oil.

Because of the special action required of these absorbing agents in carrying out the process of the present invention their relative values as absorbing agents vary as their reactivity. For example, clupanodonic acid, $C_{21}H_{33}COOH$, has five double bonds and is, therefore, very reactive, with the result that, when added to the concentrated solution of cyclohexane monosulphonic acid which contains the excess of free sulphuric acid, it completes the absorption of the free sulphuric acid almost during the time that it is being added. Erucic acid, $C_{21}H_{41}COOH$, has only one double bond and therefore is much less reactive and much slower in its absorbing action. Ricinoleic acid, $C_{17}H_{32}(OH)COOH$, is a special case because of its hydroxyl constituent and may therefore be utilized to advantage.

When adding one of these compounds, which answer the definition of an absorbing agent hereinabove given, to the concentrated solution of cyclohexane monosulphonic acid containing the excess of free sulphuric acid, an excess of the absorbing compound of at least ten percent over that shown to be required by the balanced equation for the particular absorbing reaction should be used. The reaction thus produced can be observed by the rapid darkening of the solution, the temperature being kept at a height of from 65° to 90° C. throughout the reaction. The darkening soon becomes black. This, however, does not indicate a charring action, no free carbon being formed. Fifteen minutes is allower for the completion of this reaction.

If the absorbing agent used has been for example, oleic acid and if the original hydrocarbon, as above stated, was cyclohexane, the product of this reaction now consists of a mixture of cyclohexane sulphonic acid plus oleosulphuric acid. If this acid mixture now be neutralized by any suitable neutralizing agent, such, for example, as triethanolamine, the end product will consist of triethanolamine cyclohexane sulphonate plus triethanolamine oleosulphate. This complex product is transparent, red-brown in color and of the consistency of #50 S. A. E. oil when cooled. It is stable when exposed to air and light, dissolves readily in water and has the pronounced emulsifying-dispersing-wetting properties desired in the end product of the present invention. For example, seven percent of the complex end product just described served to emulsify forty percent by weight of boiled linseed oil in water. This emulsion, after ten days, showed very little tendency to separate.

It is to be noted for purposes of calculation that every double bond in the unsaturated organic acid used as an absorbing agent should be capable of absorbing one mole of sulphuric acid. For example, if palmitoleic acid be employed as the absorbing agent the reaction should be complete between $C_{15}H_{29}COOH$ and $OHSO_2OH$. In practice, however, as above stated, an excess of the organic acid of not less than ten percent above that required to satisfy the above formula should be employed.

What is claimed as new is:

1. The process of producing, as an end product, a mixture of chemical compounds having pronounced emulsifying, dispersing and wetting properties which consists in sulfonating a cycloaliphatic hydrocarbon by the use of an excess of concentrated sulfuric acid over the amount called for by the reaction equation sufficient to insure a substantial residuum of active free sulfuric acid in the product of this step, making a substantially saturated solution of the product of this step in chilled water, heating the saturated solution to at least 60° C. and effecting an absorption of the excess sulfuric acid content thereof by the addition of an unsaturated aliphatic acid, the molecule of which has at least one double bond and comprises at least ten carbon atoms, and then neutralizing the mixture of acids thus formed by adding thereto an ethanolamine, that will combine with each acid to form a salt thereof.

2. A process according to claim 1 in which the excess of concentrated sulfuric acid used is at least 50% over the amount called for by the reaction equation.

3. A process according to claim 1 in which the cycloaliphatic hydrocarbon is cyclohexane.

4. A process according to claim 1 in which the cycloaliphatic hydrocarbon is cyclohexane and the neutralizing material is triethanolamine.

5. A process according to claim 1 in which the cycloaliphatic hydrocarbon is cyclohexane, the unsaturated organic acid employed as the absorbing agent is oleic acid and the neutralizing material is triethanolamine.

6. A process according to claim 1 in which an excess of the unsaturated aliphatic acid employed as the absorbing agent of at least 10% over that shown to be required by the balanced equation for the given absorbing reaction is used.

ALFRED R. GLOBUS.

REFERENCES CITED

The following references are of record in the file of this patent:

UNITED STATES PATENTS

| Number | Name | Date |
| --- | --- | --- |
| 1,799,824 | Kern et al. | Apr. 7, 1931 |
| 1,812,615 | Wall | June 30, 1931 |
| 2,337,552 | Henke | Dec. 28, 1943 |